US009909918B2

(12) United States Patent
Valentin

(10) Patent No.: US 9,909,918 B2
(45) Date of Patent: Mar. 6, 2018

(54) ULTRASONIC SCANNING DEVICE HAVING A FLUID PAD

(71) Applicant: Siemens Energy, Inc., Orlando, FL (US)

(72) Inventor: Ranier Valentin, Winter Springs, FL (US)

(73) Assignee: Siemens Energy, Inc., Orlando, FL (US)

( * ) Notice: Subject to any disclaimer, the term of this patent is extended or adjusted under 35 U.S.C. 154(b) by 329 days.

(21) Appl. No.: 14/811,869

(22) Filed: Jul. 29, 2015

(65) Prior Publication Data
US 2017/0030767 A1 Feb. 2, 2017

(51) Int. Cl.
*G01D 5/20* (2006.01)
*G01H 1/00* (2006.01)

(52) U.S. Cl.
CPC .............. *G01H 1/006* (2013.01); *G01D 5/20* (2013.01)

(58) Field of Classification Search
CPC .................................. G01H 1/006; G01D 5/20
USPC .......................................................... 73/660
See application file for complete search history.

(56) References Cited

U.S. PATENT DOCUMENTS

| 4,843,884 A * | 7/1989 | House | G01N 29/26 73/622 |
|---|---|---|---|
| 6,167,760 B1 * | 1/2001 | Brunty | G01N 29/0645 73/634 |
| 7,234,354 B2 * | 6/2007 | Barshinger | G01N 29/0645 73/619 |
| 7,712,369 B2 * | 5/2010 | Georgeson | G01N 29/04 73/602 |
| 7,755,558 B2 * | 7/2010 | Ueda | H01Q 7/08 343/728 |
| 2005/0132809 A1 * | 6/2005 | Fleming | G01N 3/00 73/597 |
| 2006/0117855 A1 * | 6/2006 | Barshinger | G01N 29/0645 73/605 |
| 2007/0186655 A1 * | 8/2007 | Reed | G01N 15/088 73/620 |

* cited by examiner

*Primary Examiner* — J M Saint Surin

(57) ABSTRACT

An ultrasonic scanning device for scanning a turbine component. The device includes an ultrasonic transducer attached to a moveable fluid distribution block, wherein the block includes a block opening and an internal passageway for receiving a fluid. The device also includes a fluid pad having a fluid pad opening that is in fluid communication with the block opening, wherein the fluid pad and block openings form a channel that extends between the ultrasonic transducer and the turbine component. Fluid received by the internal passageway moves to the channel and forms a fluid column between the ultrasonic transducer and the turbine component that facilitates transmission of ultrasonic energy generated by the ultrasonic transducer. In addition, the device includes a control module for controlling operation of the ultrasonic transducer and an encoder for providing travel information to the control module for determining a position of the device relative to the turbine component.

20 Claims, 10 Drawing Sheets

ULTRASONIC SCANNING DEVICE HAVING A FLUID PAD

FIELD OF THE INVENTION

This invention relates to ultrasonic scanning of an object such as a turbine component, and more particularly, to an ultrasonic scanning device that includes a moveable fluid distribution block and a fluid pad wherein a channel extends between an ultrasonic transducer and the object such that fluid received in the channel forms a fluid column between the ultrasonic transducer and the object that facilitates transmission of ultrasonic energy generated by the ultrasonic transducer.

BACKGROUND OF THE INVENTION

In various multistage turbomachines used for energy conversion, such as gas turbines, a fluid is used to produce rotational motion. Referring to FIG. 1, an axial flow gas turbine 10 includes a multi-stage compressor section 12, a combustion section 14, a multi stage turbine section 16 and an exhaust system 18 arranged along a center axis 20. Air at atmospheric pressure is drawn into the compressor section 12 generally in the direction of the flow arrows F along the axial length of the turbine 10. The intake air is progressively compressed in the compressor section 12 by rows of rotating compressor blades, thereby increasing pressure, and directed by mating compressor vanes to the combustion section 14, where it is mixed with fuel, such as natural gas, and ignited to create a combustion gas. The combustion gas, which is under greater pressure, temperature and velocity than the original intake air, is directed to the turbine section 16. The turbine section 16 includes a plurality of airfoil shaped turbine blades 22 arranged in a plurality of rows $R_1$, $R_2$, etc. on a shaft 24 that rotates about the axis 20. The combustion gas expands through the turbine section 16 where it is directed in a combustion flow direction F across the rows of blades 22 by associated rows of stationary vanes 24. A row of blades 22 and associated row of vanes 24 form a stage. In particular, the turbine section 16 may include four stages. As the combustion gas passes through the turbine section 16, the combustion gas causes the blades 22 and thus the shaft 24 to rotate about the axis 20, thereby extracting energy from the flow to produce mechanical work.

Nondestructive examination (hereinafter "NDE") techniques, such as ultrasonic testing techniques, have been used to evaluate the manufacturing quality and operational integrity of turbine structures and components. In one type of ultrasonic testing technique known as immersion testing, a turbine structure or component to be tested (i.e. test object) is immersed in a tank of water. An ultrasonic transducer is also placed in the water and spaced apart from the test object to form a column of water between the water and the test object that facilitates the transmission of ultrasonic energy generated by the ultrasonic transducer to the test object. The ultrasonic transducer then generates ultrasonic energy that is transmitted through the water toward the test object. Ultrasonic energy is reflected from the test object and is detected in order to determine whether flaws or defects are present in the test object.

It is desirable to perform ultrasonic testing of turbine structures or components of turbines that are currently operational, i.e. turbines that are in the field. However, the turbine structure or component must be removed from the turbine and then transported to an NDE laboratory for inspection in order to perform immersion testing, which undesirably delays the inspection process.

SUMMARY OF INVENTION

An ultrasonic scanning device for scanning an object such as a turbine component is disclosed. The device includes an ultrasonic transducer attached to a moveable fluid distribution block, wherein the block includes a block opening and an internal passageway for receiving a fluid. The device also includes a fluid pad having a fluid pad opening that is in fluid communication with the block opening, wherein the fluid pad and block openings form a channel that extends between the ultrasonic transducer and the turbine component. Fluid received by the internal passageway moves to the channel and forms a fluid column between the ultrasonic transducer and the turbine component that facilitates transmission of ultrasonic energy generated by the ultrasonic transducer. In addition, the device includes a control module for controlling operation of the ultrasonic transducer and an encoder for providing travel information to the control module for determining a position of the device relative to the turbine component.

In addition, a method for scanning a turbine component is disclosed. The method includes providing a moveable fluid distribution block, wherein the block includes a block opening and an internal passageway for receiving a fluid and wherein the internal passageway is in fluid communication with the block opening. The method also includes providing an ultrasonic transducer that generates ultrasonic energy and a fluid pad having a fluid pad opening that is in fluid communication with the block opening. In addition, the method includes forming a channel that extends between the ultrasonic transducer and the turbine component wherein fluid received by the internal passageway moves to the channel. Further, the method includes forming a fluid column between the ultrasonic transducer and the turbine component that facilitates transmission of ultrasonic energy generated by the ultrasonic transducer.

Those skilled in the art may apply the respective features of the present invention jointly or severally in any combination or sub-combination.

BRIEF DESCRIPTION OF DRAWINGS

The teachings of the present disclosure can be readily understood by considering the following detailed description in conjunction with the accompanying drawings, in which.

To facilitate understanding, identical reference numerals have been used, where possible, to designate identical elements that are common to the figures.

DETAILED DESCRIPTION

Figure 1:
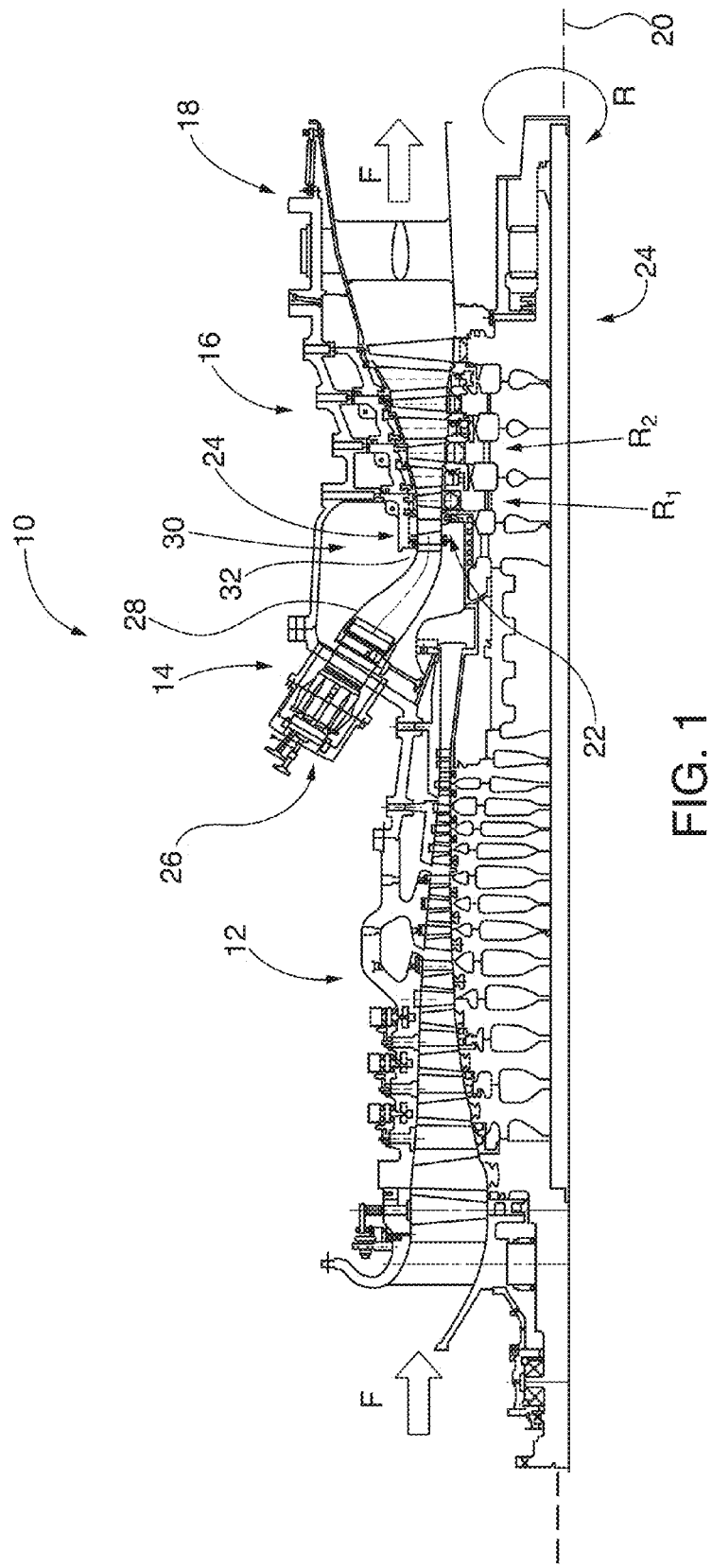
FIG. 1 is a partial cross sectional view of an axial flow gas turbine.

Although various embodiments that incorporate the teachings of the present disclosure have been shown and described in detail herein, those skilled in the art can readily devise many other varied embodiments that still incorporate these teachings. The scope of the disclosure is not limited in its application to the exemplary embodiment details of construction and the arrangement of components set forth in the description or illustrated in the drawings. The disclosure encompasses other embodiments and of being practiced or of being carried out in various ways. Also, it is to be understood that the phraseology and terminology used herein is for the purpose of description and should not be regarded as limiting. The use of "including," "comprising," or "having" and variations thereof herein is meant to encompass the items listed thereafter and equivalents thereof as well as additional items. Unless specified or limited otherwise, the terms "mounted," "connected," "supported," and "coupled" and variations thereof are used broadly and encompass direct and indirect mountings, connections, supports, and couplings. Further, "connected" and "coupled" are not restricted to physical or mechanical connections or couplings.

Figure 2:
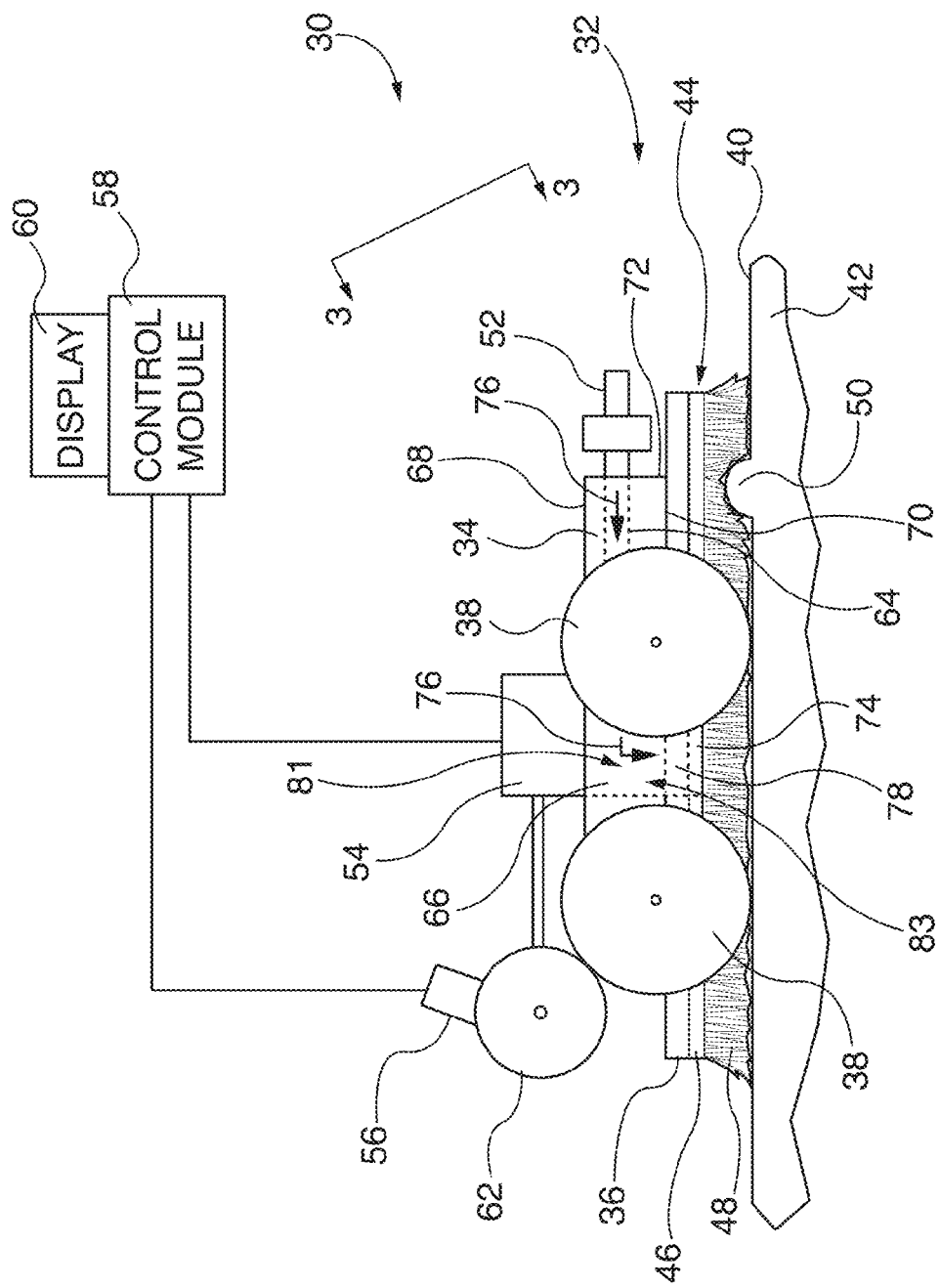
FIG. 2 depicts an ultrasonic inspection system in accordance with the invention.
Figure 3:
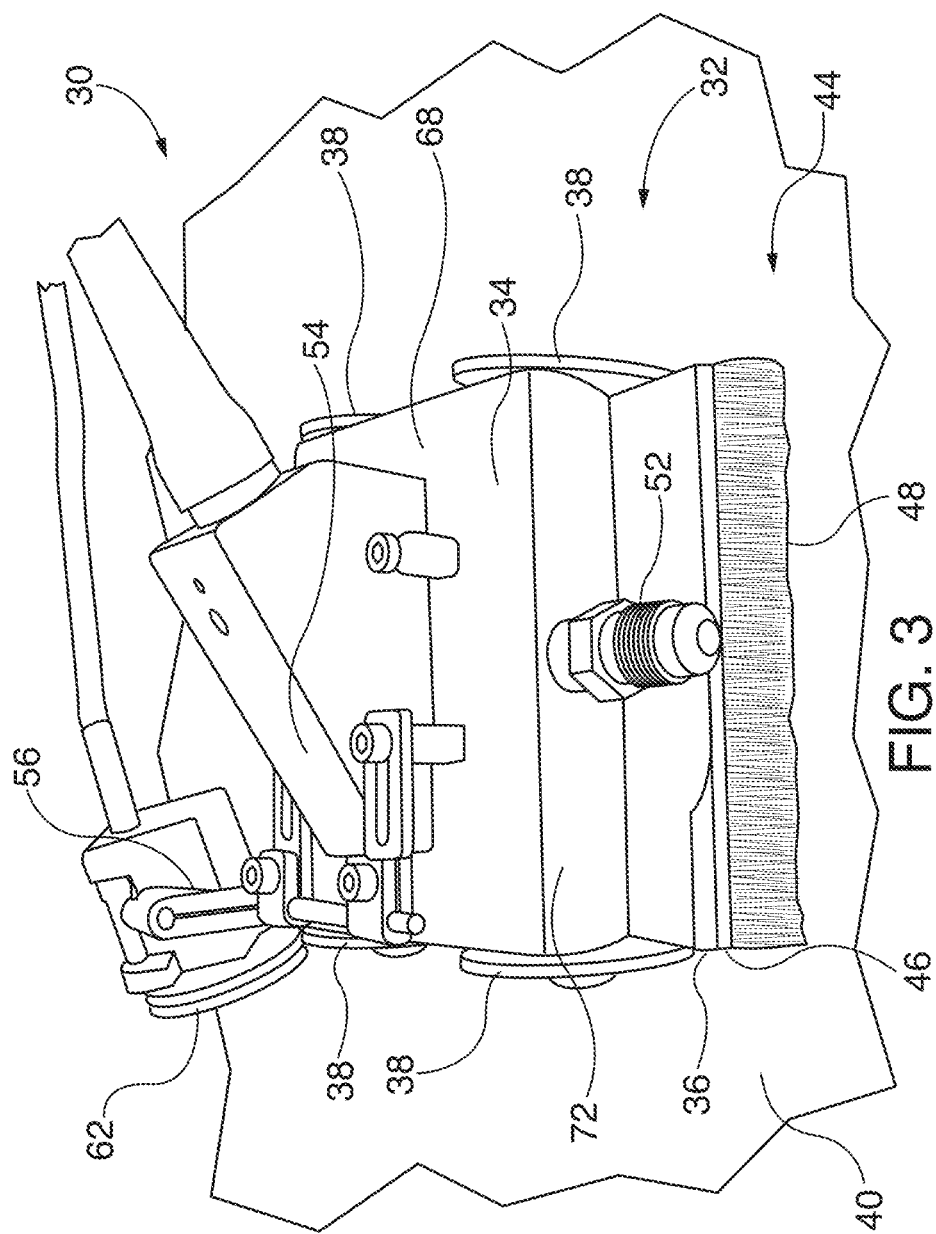
FIG. 3 is a view of the ultrasonic inspection system along view line 3-3 of FIG. 2.

Referring to FIG. 2, an ultrasonic inspection system 30 in accordance with the invention is shown. Referring to FIG. 3, a view of the system 30 along view line 3-3 of FIG. 2 is shown. The system 30 includes an ultrasonic inspection device 32 having a fluid distribution block 34 and a backing plate 36. The block 34 is supported on a test surface 40 of a test object 42, such as a structure or component of a turbine, by block wheels 38 that are rotatable to enable movement of the device 32 on the test surface 40. The device 32 may be moved by an operator. Alternatively, the device 32 may include at least one motor that rotates at least one wheel to provide movement of the device 32. The device 32 also includes a fluid pad 44 that is removeably attached to the backing plate 36. The fluid pad 44 includes a sponge element 46 having downwardly extending fibers 48 that are tightly packed and form a nap-like surface that contacts the test surface 40. The fibers 48 are fabricated from a resilient material thus enabling the fibers 48 to substantially conform to the shape of surface irregularities or surface contours encountered when the device 32 is moved on the test surface 40. In FIG. 2, portions of the fibers 48 are shown conforming to the shape of an exemplary irregularity 50 on test surface 40. In an embodiment, the fluid pad 44 may be a conventional painter's pad. The block 34 further includes a fluid inlet 52 for receiving a fluid (shown by arrows 76) that is then channeled through the block 34, fluid pad 44 and onto the test surface 40. In an embodiment, the fluid is an ultrasonic couplant such as water although it is understood that other fluids or couplants may be used.

The system 30 further includes an ultrasonic transducer 54 and an encoder 56 that are connected to a control module 58 having a display 60. The ultrasonic transducer 54 is located over a block opening 66 formed in the block 34. Operation of the ultrasonic transducer 54 is controlled by an operator via the control module 58 and display 60. The encoder 56 includes an encoder wheel 62 that contacts a block wheel 38. Rotation of the block wheel 38 causes corresponding rotation of the encoder wheel 62, thus providing travel information to the control module 58 that is used for determining a position of the device 32 relative to the test object 42. In an embodiment, the ultrasonic transducer 54 may be a phased array ultrasonic transducer. A known ultrasonic transducer 34, control module 58 and encoder 56 may be used such as, for example, an OmniScan Ultrasonic Transducer Model 5L64A2, OmniScan MX Phased Array Ultrasonic System and associated encoder sold by Olympus Corporation, Tokyo, Japan.

Figure 4:
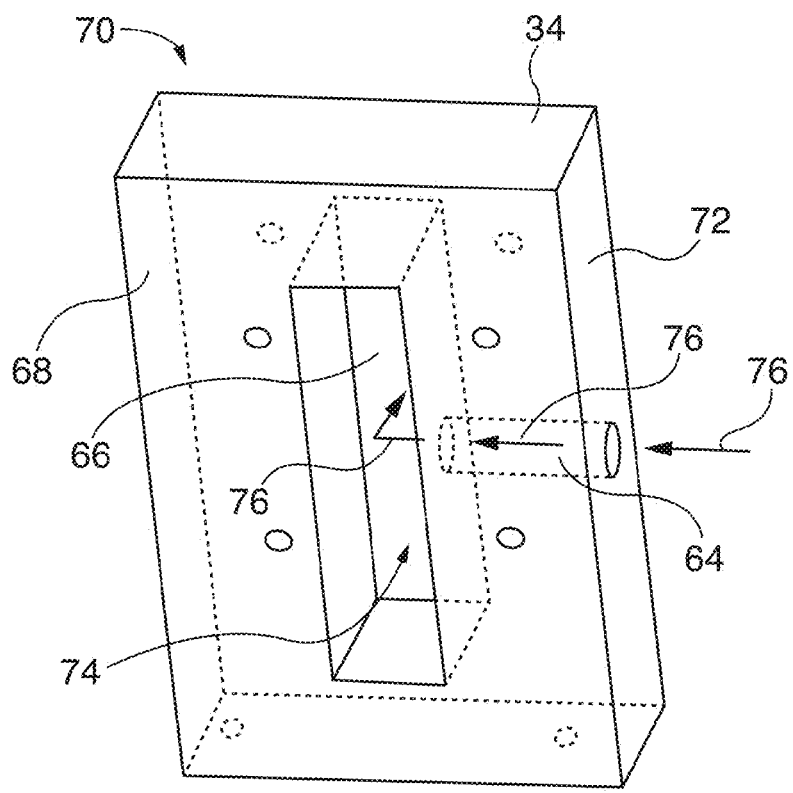
FIG. 4 is a perspective top view of a fluid distribution block in accordance with the invention.
Figure 5:
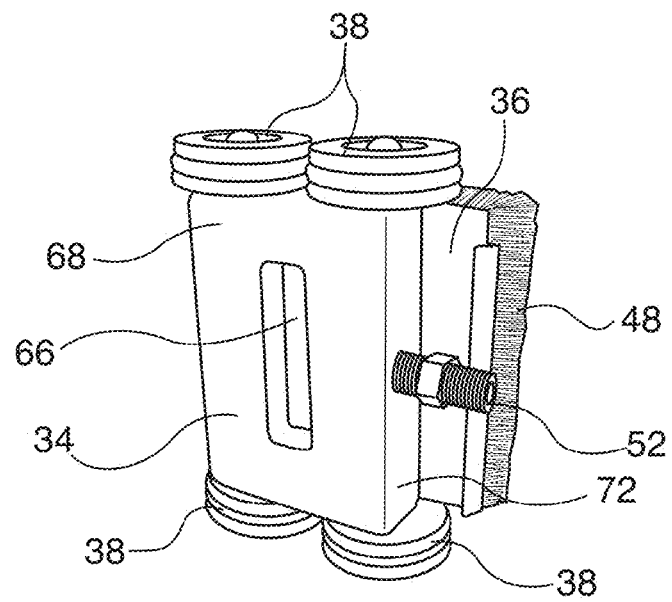
FIG. 5 is a perspective top view of an ultrasonic inspection device with an ultrasonic transducer and encoder removed.

Referring to FIG. 4, a perspective top view of the block 34 is shown. FIG. 5 is a perspective top view of the device 32 with the ultrasonic transducer 54 and encoder 56 removed. As previously described, the block 34 includes the block opening 66. Referring to FIGS. 2 and 4, the block opening 66 extends through top 68 and bottom 70 surfaces of the block 34. The block 34 also includes an inlet passageway 64 that receives the fluid inlet 52. The inlet passageway 64 extends from a side surface 72 of the block 34 to the block opening 66 and is in fluid communication with the block opening 66. In use, the fluid inlet 52 is connected to a fluid supply that provides a continuous flow of fluid. Fluid (shown by arrows 76) then flows through the inlet passageway 64 to the block opening 66 and exits a bottom portion 74 of the block opening 66.

Figure 6:
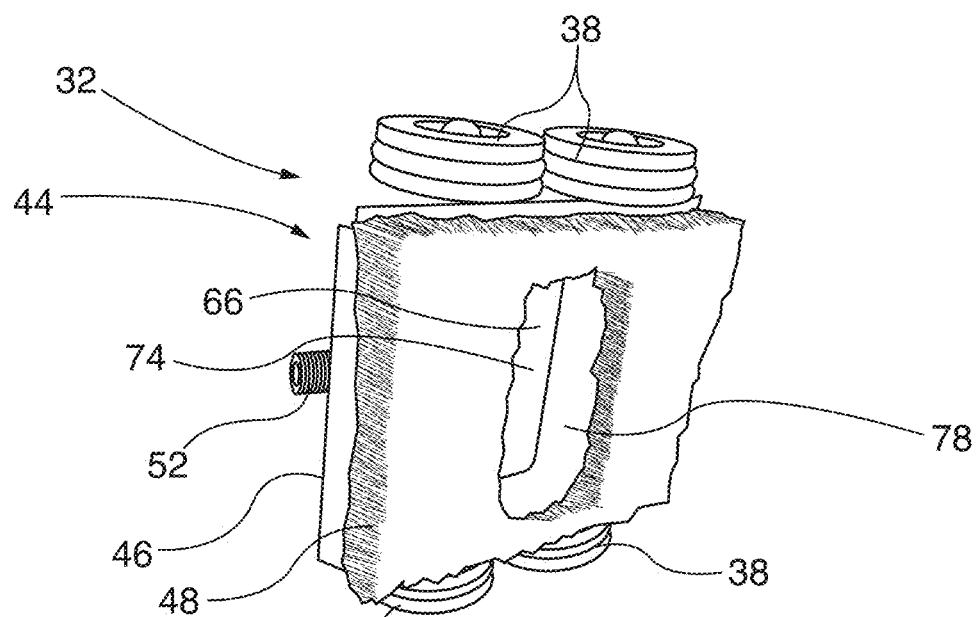
FIG. 6 is a perspective bottom view of the ultrasonic inspection device.

Referring to FIG. 6, a perspective bottom view of the device 32 is shown. The fluid pad 44 includes a fluid pad opening 78 that extends through the sponge element 46 and the fibers 48. The fluid pad opening 78 and the block opening 66 are aligned and form a channel 81 that extends between the ultrasonic transducer 34 and the test surface 40 such that the fluid pad opening 78 is in fluid communication with the block opening 66 (see FIG. 2). The fluid that exits the block opening 66 then flows through the fluid pad opening 78 and is partially retained or encapsulated in the fluid pad opening 78 by the sponge element 46 and the fibers 48. The fluid that is present in the block 66 and fluid pad 78 openings form a fluid column 83 in the channel 81 that extends between the ultrasonic transducer 54 and the test surface 40. The fluid column 83, which includes an ultrasonic couplant such as water, facilitates the transmission of ultrasonic energy generated by the ultrasonic transducer 54 to the test object 42. In an embodiment, the system 30 may be programmed to operate via a known gate following mode to compensate for a fluid column size.

The device 32 is configured to be small and portable to enable an operator to perform immersion ultrasonic inspections of turbine structures or components in the field. As a result, inspection delays due to having to remove a turbine structure or component from the turbine, and then transporting turbine structure or component to an NDE laboratory to perform an immersion ultrasonic inspection, are reduced or eliminated.

Test Results

Figure 7:
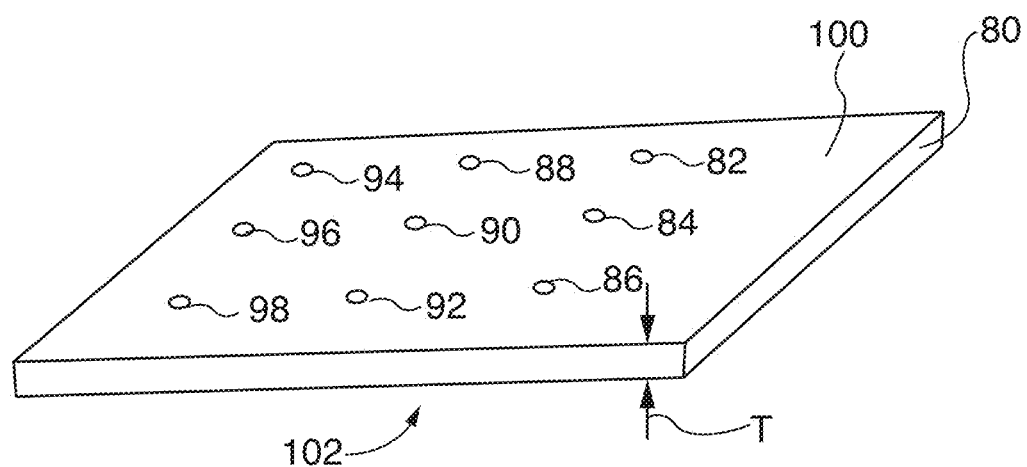
FIG. 7 is a view of a plate used in evaluating the ability of the ultrasonic inspection system to detect a depth of holes formed on the plate.

Tests were conducted to evaluate the ability of the system 30 to detect a depth of flat bottom holes formed on a plate 80 configured as a corrosion standard and having a thickness T of approximately 0.750 in. Referring to FIG. 7, the plate includes first 82, second 84 and third 86 flat bottom holes each having a diameter of approximately 0.375 in. The plate also includes fourth 88, fifth 90 and sixth 92 flat bottom holes each having a diameter of approximately 0.250 in. In addition, the plate includes seventh 94, eighth 96 and ninth 98 flat bottom holes each having a diameter of approximately 0.125 in. The holes 82, 88, 94 each have a depth of approximately 0.375 in. when measured relative to a first surface 100 of the plate 80. In addition, the holes 84, 90, 96 each have a depth of approximately 0.250 in, when measured relative to the first surface 100. Further, the holes 86, 92, 98 each have a depth of approximately 0.125 in. when measured relative to the first surface 100. During the test, the depth of each hole 82-98 was measured relative to a second surface 102 of the plate 80 opposite the first surface 100. Thus, the depth of holes 82, 88, 94 is approximately 0.375 in., the depth of holes 84, 90, 96 is approximately 0.500 in. and the depth of holes 86, 92, 98 is approximately 0.625 in. when measured relative to the second surface 102.

Figure 8:
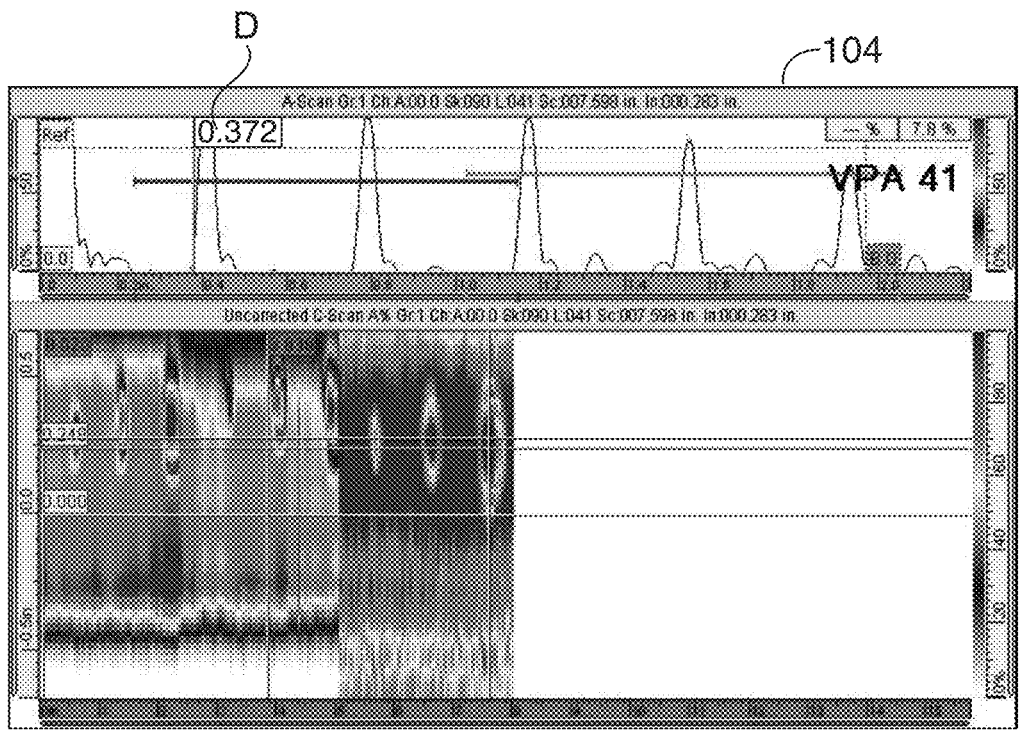
FIGS. 8-10 show charts depicting A-scan results for measuring a depth of holes formed in a plate wherein the holes have an actual depth of approximately 0.375 in. when measured relative to a second surface of the plate.
Figure 9:
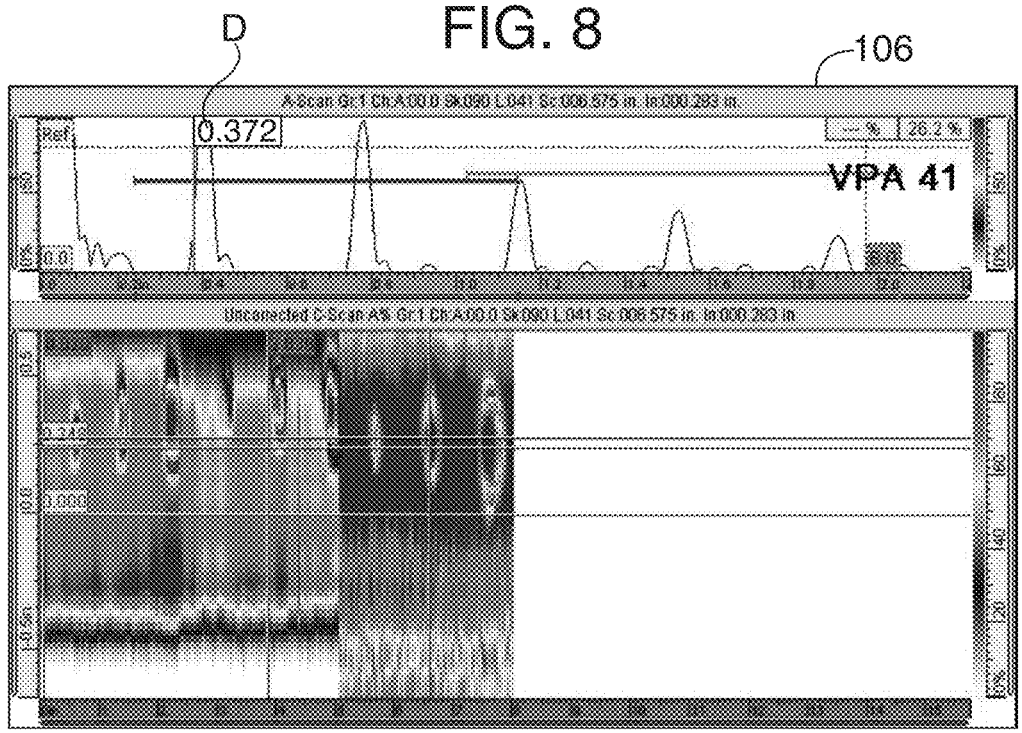
Figure 10:
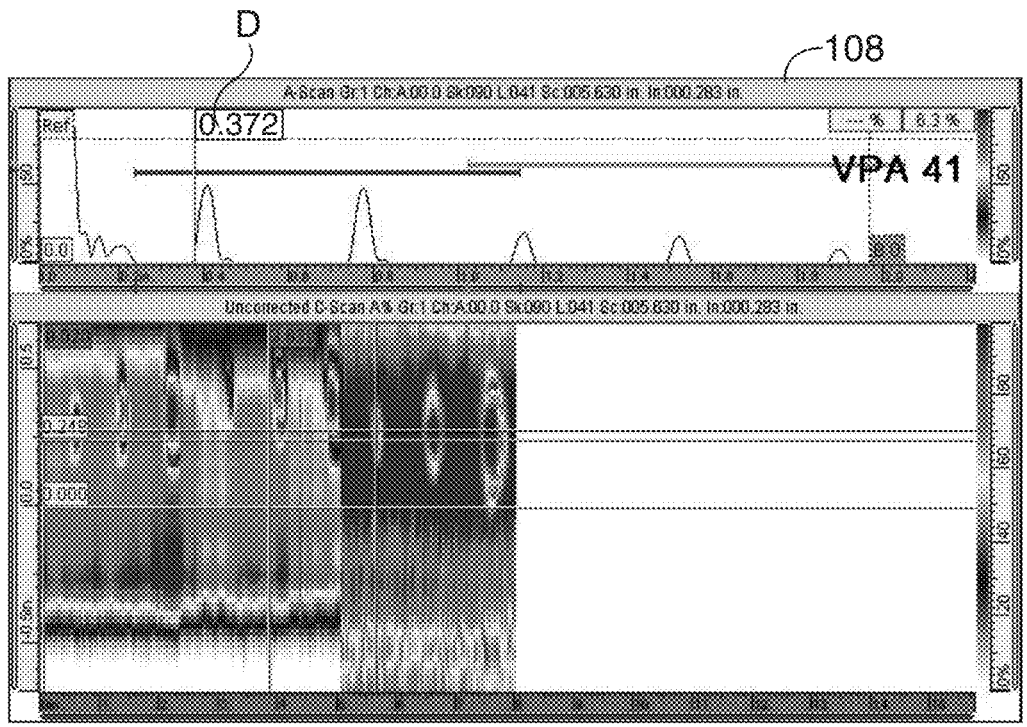
Figure 11:
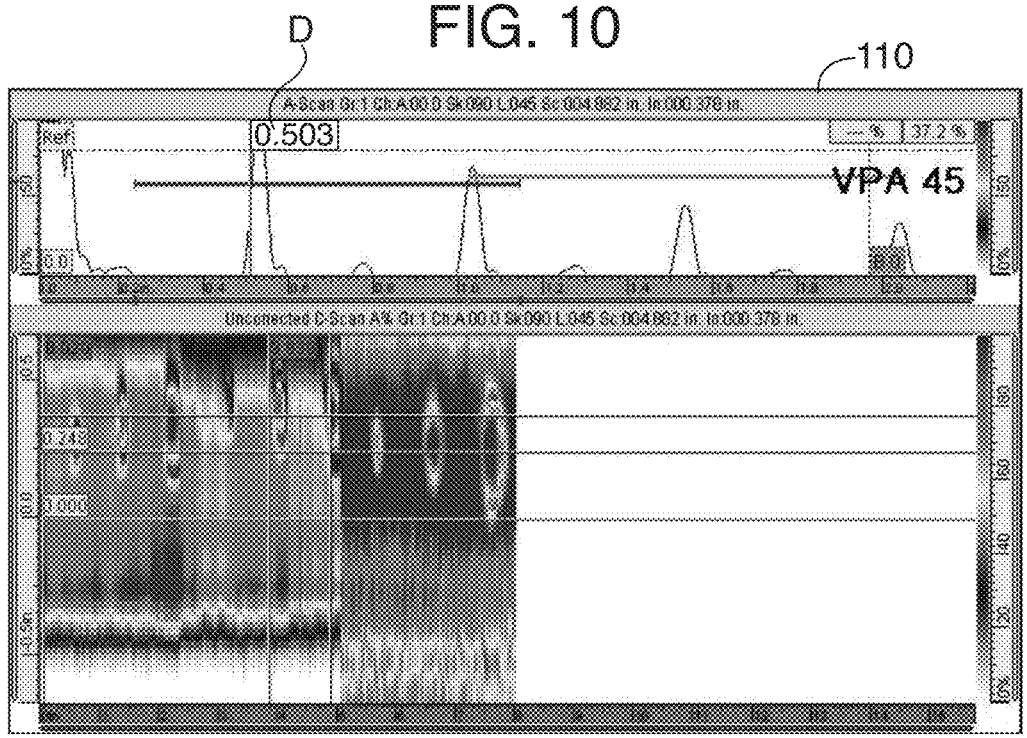
FIGS. 11-13 show charts depicting A-scan results for measuring a depth of holes formed in the plate wherein the holes have an actual depth of approximately 0.500 in. when measured relative to the second surface of the plate.
Figure 12:
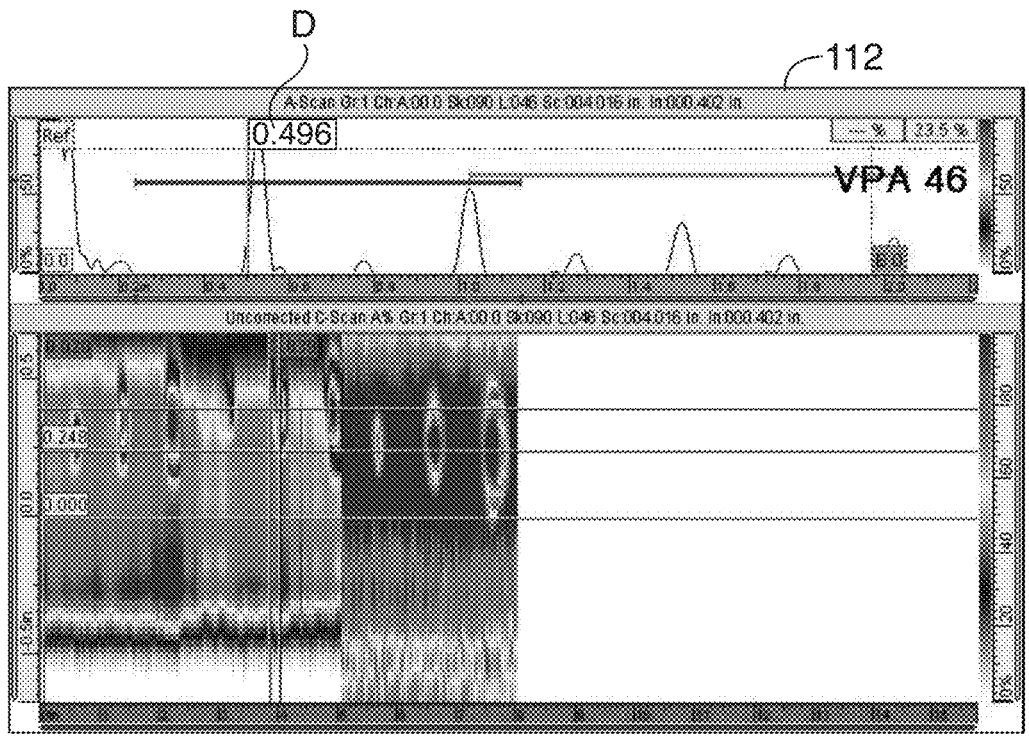
Figure 13:
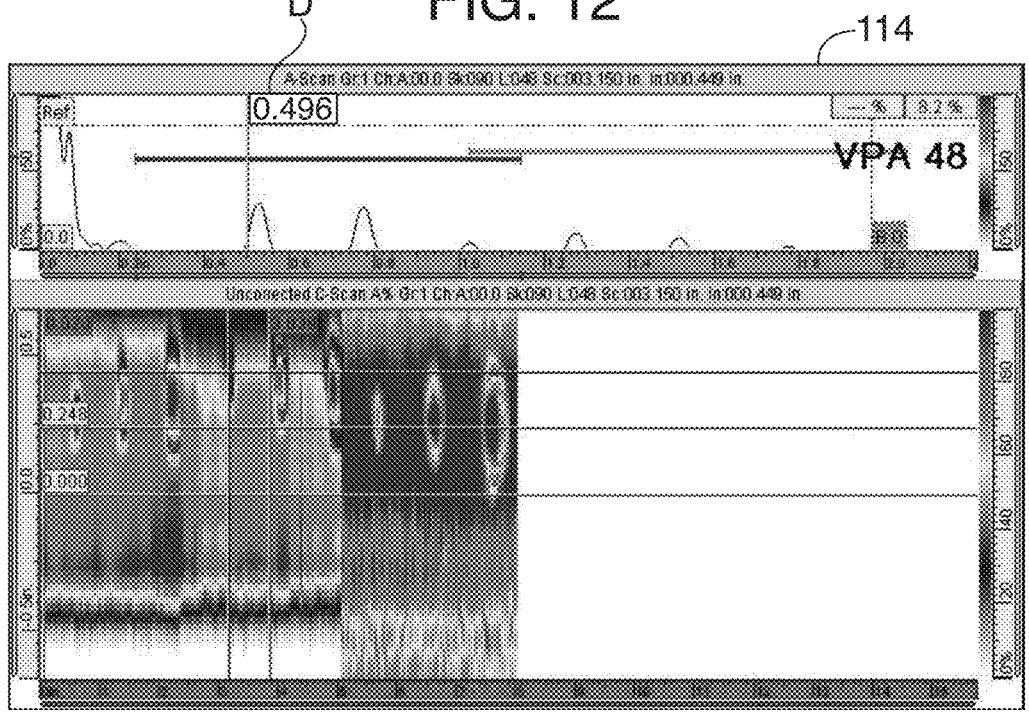
Figure 14:
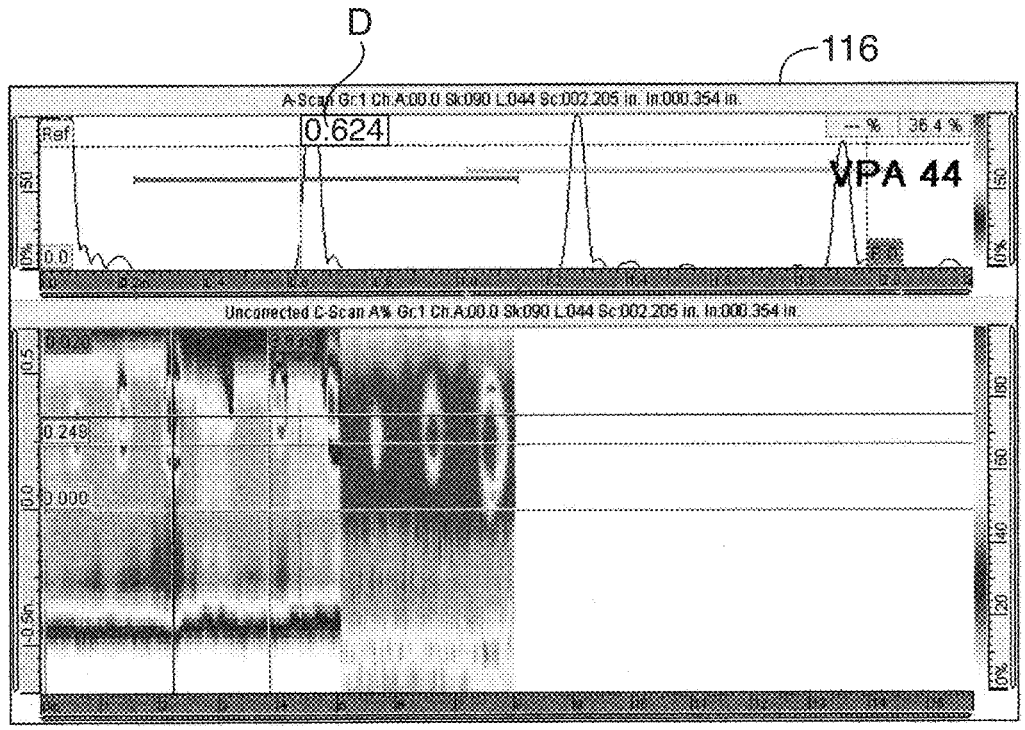
FIGS. 14-16 show charts depicting A-scan results for measuring a depth of holes formed in the plate wherein the holes have an actual depth of approximately 0.625 in. when measured relative to the second surface of the plate.
Figure 15:
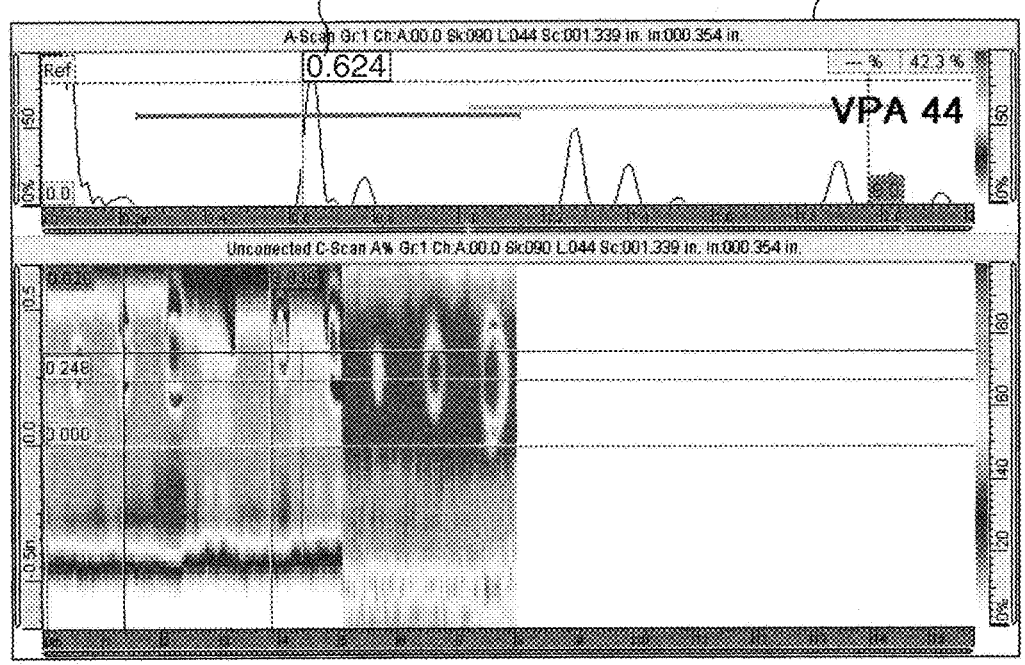
Figure 16:
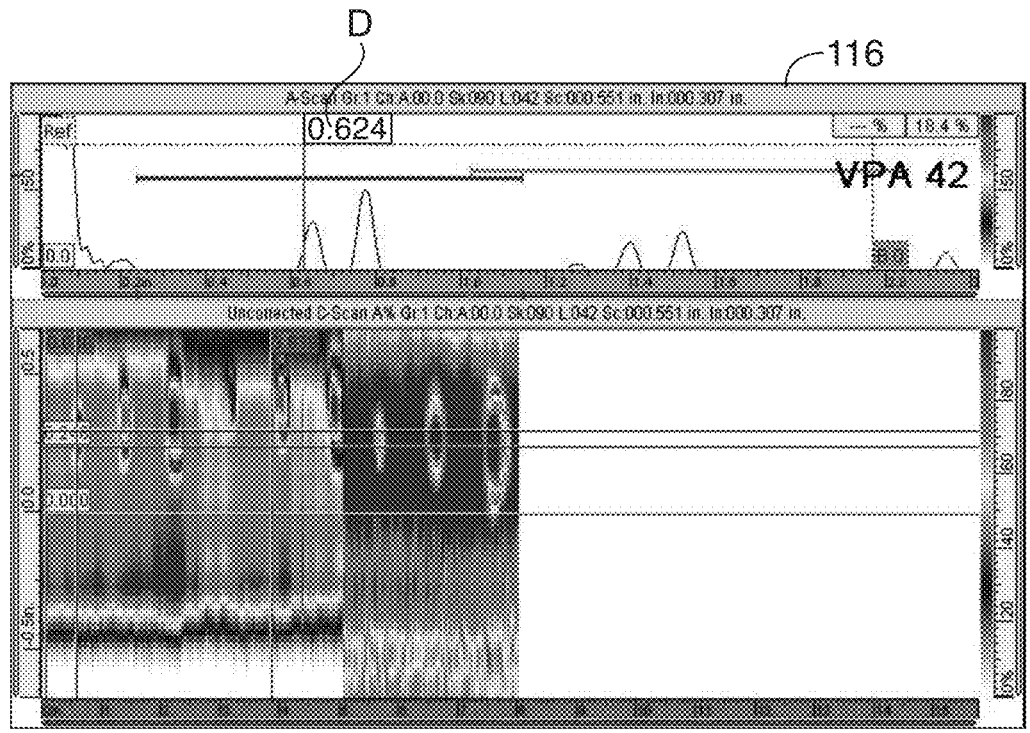
Figure 17:
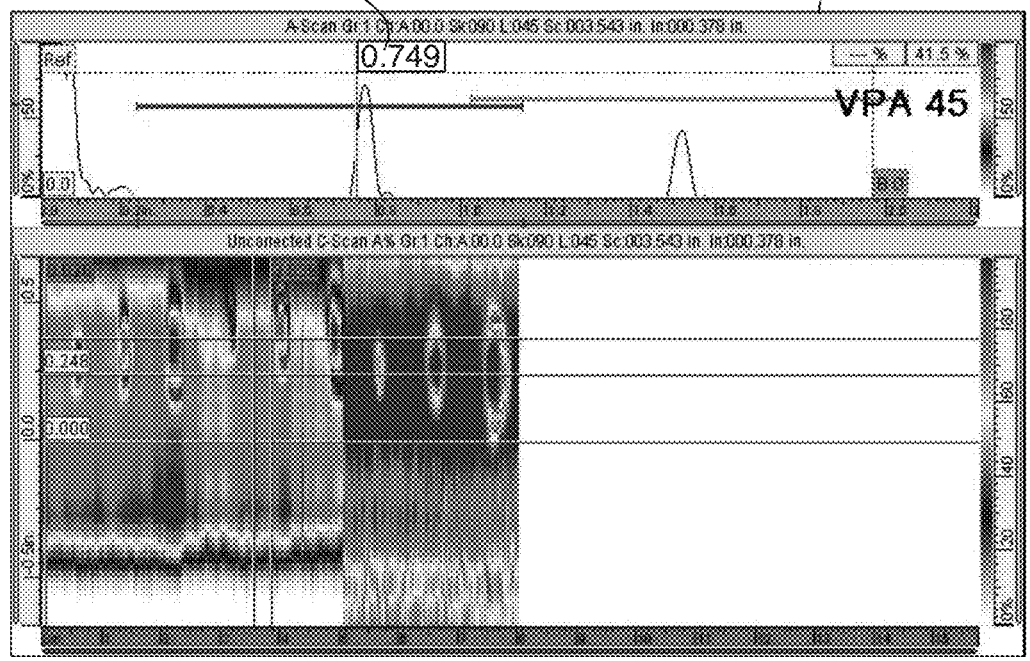
FIG. 17 shows a chart depicting A-scan results for measuring the depth of only the plate.

Referring to FIGS. 8, 9 and 10, charts 104, 106, 108 depict A-scan results for measuring the depth of holes 82, 88, 94, respectively. In particular, the system 30 detects a depth D of 0.372 in. for each hole 82, 88, 94 as compared to the approximate 0.375 in. actual depth for these holes when measured relative to the second surface 102. Referring to FIGS. 11, 12 and 13, charts 110, 112, 114 depict A-scan results for measuring the depth of holes 84, 90, 96, respectively. In particular, the system 30 detects a depth D of 0.503 in., 0.496 and 0.496 for holes 84, 90, 96, respectively, as compared to the approximate 0.500 in, actual depth for these holes when measured relative to the second surface 102. Referring to FIGS. 14, 15 and 16, charts 116, 118, 120 depict A-scan results for measuring the depth of holes 86, 92, 98, respectively. In particular, the system 30 detects a depth D of 0.624 in, for each hole 86, 92, 98 as compared to the approximate 0.625 in. actual depth for these holes when measured relative to the second surface 102. Referring to FIG. 17, chart 122 depicts A-scan results for measuring the depth of only the plate 80 (i.e. no holes). In particular, the system 30 detects a depth D of 0.749 in, for the plate 80 as compared to the approximate 0.750 in, actual thickness of the plate 80.

While particular embodiments of the present disclosure have been illustrated and described, it would be obvious to those skilled in the art that various other changes and modifications can be made without departing from the spirit and scope of the disclosure. It is therefore intended to cover in the appended claims all such changes and modifications that are within the scope of this disclosure.

What is claimed is:

1. An ultrasonic scanning device for scanning an object, comprising:
   a moveable fluid distribution block that is moveable relative to a surface of the object, wherein the block includes a block opening and an internal passageway for receiving a fluid, wherein the internal passageway is in fluid communication with the block opening;
   an ultrasonic transducer attached to the block; and
   a fluid pad having a fluid pad opening that is in fluid communication with the block opening, wherein the fluid pad and block openings form a channel that extends between the ultrasonic transducer and the object and wherein fluid received by the internal passageway moves to the channel and forms a fluid column between the ultrasonic transducer and the object that facilitates transmission of ultrasonic energy generated by the ultrasonic transducer wherein the fluid pad includes fibers that extend from the fluid pad and contact the surface wherein the fibers substantially conform to more than one contour of the surface as the block moves relative to the surface.

2. The device according to claim 1, wherein the fluid pad includes a sponge element.

3. The device according to claim 1, wherein the sponge and fibers partially retain a portion of the fluid.

4. The device according to claim 1, wherein the block includes wheels for enabling movement of the block by an operator.

5. The device according to claim 1, further including an encoder for determining a position of the device relative to the object.

6. The device according to claim 5, wherein the encoder includes an encoder wheel that is rotated by movement of the block to provide travel information used for determining a position of the device relative to the object.

7. The device according to claim 1, wherein the fluid is water.

8. An ultrasonic scanning device for scanning a turbine component, comprising:
   a moveable fluid distribution block that is moveable relative to a surface of the turbine component, wherein the block includes a block opening and an internal passageway for receiving a fluid, wherein the internal passageway is in fluid communication with the block opening;
   an ultrasonic transducer attached to the block;
   a fluid pad having a fluid pad opening that is in fluid communication with the block opening, wherein the fluid pad and block openings form a channel that extends between the ultrasonic transducer and the turbine component and wherein fluid received by the internal passageway moves to the channel and forms a fluid column between the ultrasonic transducer and the turbine component that facilitates transmission of ultrasonic energy generated by the ultrasonic transducer wherein the fluid pad includes fibers that extend from the fluid pad and contact the surface wherein the fibers substantially conform to more than one contour of the surface as the block moves relative to the surface;
   a control module for controlling operation of the ultrasonic transducer; and
   an encoder for providing travel information to the control module for determining a position of the device relative to the turbine component.

9. The device according to claim 8, wherein the fluid pad includes a sponge element.

10. The device according to claim 9, wherein the sponge and fibers partially retain a portion of the fluid.

11. The device according to claim 8, wherein the block includes wheels for enabling movement of the block by an operator.

12. The device according to claim 5, wherein the encoder includes an encoder wheel that contacts a block wheel wherein rotation of the block wheel causes corresponding rotation of the encoder wheel to provide travel information to the control module used for determining a position of the device relative to the component.

13. The device according to claim 1, wherein the fluid is water.

14. A method for scanning a turbine component, comprising:
   providing a moveable fluid distribution block that is moveable relative to a surface of the turbine component, wherein the block includes a block opening and an internal passageway for receiving a fluid and wherein the internal passageway is in fluid communication with the block opening;

providing an ultrasonic transducer that generates ultrasonic energy;

providing a fluid pad having a fluid pad opening that is in fluid communication with the block opening;

forming a channel that extends between the ultrasonic transducer and the turbine component wherein fluid received by the internal passageway moves to the channel; and forming a fluid column between the ultrasonic transducer and the turbine component that facilitates transmission of ultrasonic energy generated by the ultrasonic transducer wherein the fluid pad includes fibers that extend from the fluid pad and contact the surface wherein the fibers substantially conform to more than one contour of the surface as the block moves relative to the surface.

15. The method according to claim 14, wherein the fluid pad includes a sponge element.

16. The method according to claim 15, wherein the sponge and fibers partially retain a portion of the fluid.

17. The method according to claim 14, wherein the block includes wheels for enabling movement of the block by an operator.

18. The device according to claim 14, further including an encoder for determining a position of the device relative to the turbine component.

19. The device according to claim 18, wherein the encoder includes an encoder wheel that is rotated by movement of the block to provide travel information used for determining a position of the device relative to the turbine component.

20. The device according to claim 14, wherein the fluid is water.

* * * * *